(12) United States Patent
Treat et al.

(10) Patent No.: US 10,458,339 B2
(45) Date of Patent: Oct. 29, 2019

(54) GAS TURBINE ENGINE CASE FLOW BLOCKING COVERS

(71) Applicant: United Technologies Corporation, Farmington, CT (US)

(72) Inventors: Christopher Treat, Manchester, CT (US); Alexander Broulidakis, Tolland, CT (US); Andrew D. Burdick, Somers, CT (US)

(73) Assignee: United Technologies Corporation, Farmington, CT (US)

( * ) Notice: Subject to any disclaimer, the term of this patent is extended or adjusted under 35 U.S.C. 154(b) by 817 days.

(21) Appl. No.: 14/993,129

(22) Filed: Jan. 12, 2016

(65) Prior Publication Data

US 2017/0198642 A1 Jul. 13, 2017

(51) Int. Cl.
| | |
|---|---|
| *F01D 9/06* | (2006.01) |
| *F01D 25/24* | (2006.01) |
| *F02C 7/32* | (2006.01) |
| *F02C 7/20* | (2006.01) |
| *F01D 25/14* | (2006.01) |
| *F02C 3/04* | (2006.01) |

(52) U.S. Cl.
CPC ............... *F02C 7/32* (2013.01); *F01D 9/065* (2013.01); *F01D 25/243* (2013.01); *F02C 3/04* (2013.01); *F01D 25/14* (2013.01); *F01D 25/24* (2013.01); *F02C 7/20* (2013.01); *F05D 2300/501* (2013.01)

(58) Field of Classification Search
CPC .... F02C 7/20; F02C 7/32; F01D 9/065; F01D 25/243; F01D 25/28; F01D 25/14; F01D 25/24; F01D 9/06; F01D 9/042; F01D 25/246
See application file for complete search history.

(56) References Cited

U.S. PATENT DOCUMENTS

| | | | | |
|---|---|---|---|---|
| 3,620,718 | A | * 11/1971 | Freche | .................... C22C 19/03 |
| | | | | 148/404 |
| 5,292,227 | A | * 3/1994 | Czachor | ................ F01D 25/162 |
| | | | | 415/142 |
| 5,316,346 | A | 5/1994 | Maurer | |
| 5,483,792 | A | 1/1996 | Czachor et al. | |

(Continued)

FOREIGN PATENT DOCUMENTS

WO 2014105619 A1 7/2014

OTHER PUBLICATIONS

European Search Report for European Application No. 17150992.0 dated May 15, 2017.

*Primary Examiner* — Gerald L Sung
*Assistant Examiner* — James P McGlynn
(74) *Attorney, Agent, or Firm* — Carlson, Gaskey & Olds, P.C.

(57) ABSTRACT

A gas turbine engine component has an engine case structure surrounding an engine center axis. A plurality of holes are formed in the engine case structure, wherein the holes are circumferentially spaced apart from each other about the engine center axis. The plurality of holes includes at least one balance hole and at least one service hole that is configured to allow another engine component to pass through the at least one service hole. At least one cover is configured to cover at least one balance hole such that air is prevented from passing through the at least one balance hole.

24 Claims, 2 Drawing Sheets

(56) References Cited

U.S. PATENT DOCUMENTS

| | | | |
|---|---|---|---|
| 5,752,802 A * | 5/1998 | Jones | F01D 5/20 |
| | | | 415/170.1 |
| 6,358,001 B1 | 3/2002 | Bosel et al. | |
| 8,366,382 B1 | 2/2013 | Muldoon et al. | |
| 8,863,531 B2 | 10/2014 | Scott et al. | |
| 8,904,746 B2 | 12/2014 | Fang et al. | |
| 9,016,068 B2 | 4/2015 | Martin et al. | |
| 9,771,829 B2 * | 9/2017 | Broulidakis | F01D 25/26 |
| 9,803,502 B2 * | 10/2017 | Cherolis | F01D 9/065 |
| 2013/0259646 A1 * | 10/2013 | Feindel | F01D 21/003 |
| | | | 415/118 |
| 2014/0093368 A1 * | 4/2014 | Scott | F01D 25/24 |
| | | | 415/208.2 |
| 2014/0093371 A1 | 4/2014 | Vo et al. | |
| 2014/0102110 A1 | 4/2014 | Farah et al. | |
| 2014/0137534 A1 | 5/2014 | Sanchez et al. | |
| 2015/0226125 A1 * | 8/2015 | Petty | F01D 25/162 |
| | | | 60/796 |
| 2015/0260057 A1 | 9/2015 | Farah et al. | |
| 2015/0330249 A1 * | 11/2015 | Budnick | F01D 25/12 |
| | | | 415/116 |
| 2015/0345400 A1 | 12/2015 | Ariel et al. | |
| 2016/0201490 A1 * | 7/2016 | Scott | F01D 25/24 |
| | | | 415/213.1 |
| 2016/0298493 A1 | 10/2016 | Broulidakis et al. | |

\* cited by examiner

GAS TURBINE ENGINE CASE FLOW BLOCKING COVERS

BACKGROUND OF THE INVENTION

One typical gas turbine engine includes multiple, nested coaxial spools. A first turbine is mounted to a first spool and a second turbine is mounted to a second spool that rotates at a higher speed than the first spool. In one example, the first turbine is a low pressure turbine and the second turbine is a high pressure turbine. A mid turbine frame is arranged axially between the low pressure turbine and the high pressure turbine.

One example mid turbine frame includes an inner turbine case that has to be configured to allow oil service lines to pass through the case. For example, the inner turbine case includes several large holes cut through the case such that oil service lines can pass through the holes. The inner turbine case also includes certain geometric features that balance stiffness in a circumferential direction. At circumferential locations where there are no service lines, there are additional holes cut so that the inner turbine case stiffness is balanced. These balancing holes are needed for structural purposes; however, these holes open up a flow area between inner and outer cavities which is not desirable from a secondary flow perspective.

SUMMARY OF THE INVENTION

In a featured embodiment, a gas turbine engine component has an engine case structure surrounding an engine center axis. A plurality of holes are formed in the engine case structure, wherein the holes are circumferentially spaced apart from each other about the engine center axis. The plurality of holes includes at least one balance hole and at least one service hole that is configured to allow another engine component to pass through the at least one service hole. At least one cover is configured to cover at least one balance hole such that air is prevented from passing through the at least one balance hole.

In another embodiment according to the previous embodiment, the cover is made from a flexible material.

In another embodiment according to any of the previous embodiments, at least one balance hole is configured to balance case stiffness of the engine case structure.

In another embodiment according to any of the previous embodiments, the engine component comprises a liquid or gas service line that passes through at least one service hole.

In another embodiment according to any of the previous embodiments, at least one cover comprises a body with an extension portion extending away from an attachment portion that is configured to fix the cover to the engine case structure.

In another embodiment according to any of the previous embodiments, the attachment portion comprises a generally flat outer peripheral portion of the body that is in direct contact with the engine case structure, and wherein the extension portion is centrally located over the at least one balance hole.

In another embodiment according to any of the previous embodiments, the flat outer peripheral portion includes at least one opening configured to receive a fastener.

In another embodiment according to any of the previous embodiments, the engine case structure comprises an inner diffuser case or an inner turbine case of a mid turbine frame.

In another embodiment according to any of the previous embodiments, the inner turbine case comprises a ring-shaped structure having an inner peripheral surface radially spaced from an outer peripheral surface. The plurality of holes extend through a thickness of the inner turbine case from the inner peripheral surface to the outer peripheral surface.

In another featured embodiment, a gas turbine engine has at least first and second spools. A first turbine is mounted to the first spool for rotation about an engine center axis. A second turbine is mounted to the second spool that rotates at a higher speed than the first spool. A mid turbine frame is arranged axially between the first turbine and the second turbine. The mid turbine frame includes an inner turbine case surrounding the engine center axis. A plurality of holes are formed in the inner turbine case, and wherein at least one first hole of the plurality of holes is configured to allow an engine component to pass through the at least one first hole, and wherein at least one second hole of the plurality of holes is circumferentially spaced from the at least one first hole. At least one cover is configured to cover at least one second hole such that air is prevented from passing through at least one second hole.

In another embodiment according to the previous embodiment, the first turbine is a low pressure turbine and the second turbine is a high pressure turbine.

In another embodiment according to any of the previous embodiments, the inner turbine case comprises a ring-shaped structure having an inner peripheral surface radially spaced from an outer peripheral surface. The plurality of holes extend through a thickness of the inner turbine case from the inner peripheral surface to the outer peripheral surface.

In another embodiment according to any of the previous embodiments, at least one second hole comprises a balancing hole to balance case stiffness of the inner turbine case.

In another embodiment according to any of the previous embodiments, the engine component comprises a liquid or gas service line that passes through the at least one first hole.

In another embodiment according to any of the previous embodiments, at least one cover comprises a body with an attachment portion and an extension portion extending away from the attachment portion, and wherein the attachment portion comprises a generally flat outer peripheral portion that is in direct contact with the inner turbine case and which includes at least one opening configured to receive a fastener, and wherein the extension portion is centrally located over the at least one second hole.

In another embodiment according to any of the previous embodiments, at least one cover is made from a flexible material.

In another embodiment according to any of the previous embodiments, the flexible material comprises sheet metal.

In another embodiment according to any of the previous embodiments, at least one second hole comprises a plurality of second holes, and wherein each second hole comprises a balancing hole to balance case stiffness, and wherein the at least one cover comprises a plurality of covers with each second hole being covered by one cover.

In another embodiment according to any of the previous embodiments, at least one first hole comprises a plurality of first holes that are circumferentially spaced form the plurality of second holes, and wherein each first hole is configured allow another engine component to pass through the respective first hole.

In another embodiment according to any of the previous embodiments, the inner turbine case comprises a ring-shaped structure having an inner peripheral surface radially spaced from an outer peripheral surface, and wherein the pluralities of first and second holes extend through a thickness of the inner turbine case from the inner peripheral surface to the outer peripheral surface.

The foregoing features and elements may be combined in any combination without exclusivity, unless expressly indicated otherwise.

These and other features may be best understood from the following drawings and specification.

DETAILED DESCRIPTION

Figure 1:
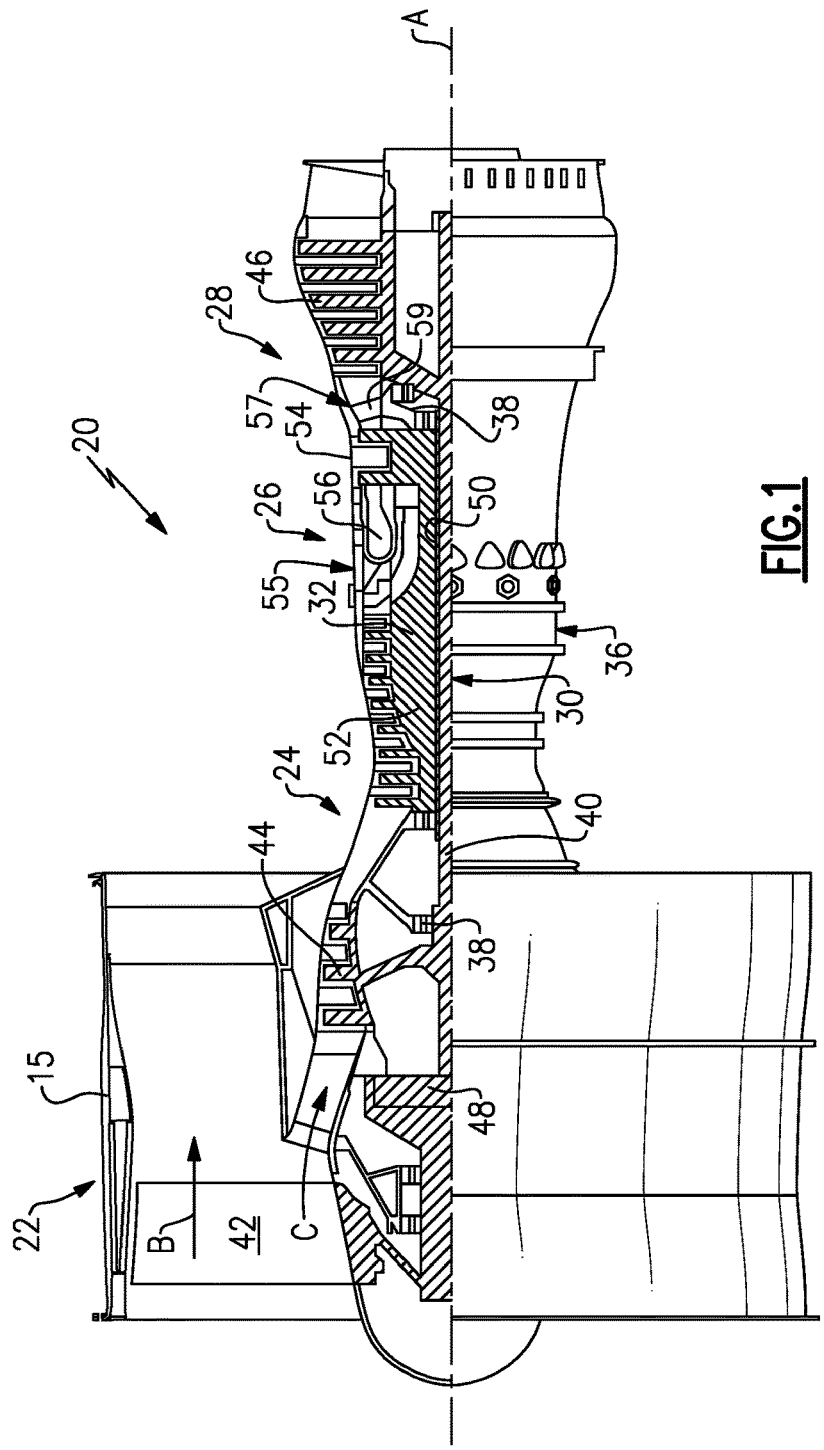
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ °\ R)/(518.7°\ R)]^{0.5}$. The "Low corrected fan tip speed" as disclosed herein according to one non-limiting embodiment is less than about 1150 ft/second.

Figure 2:
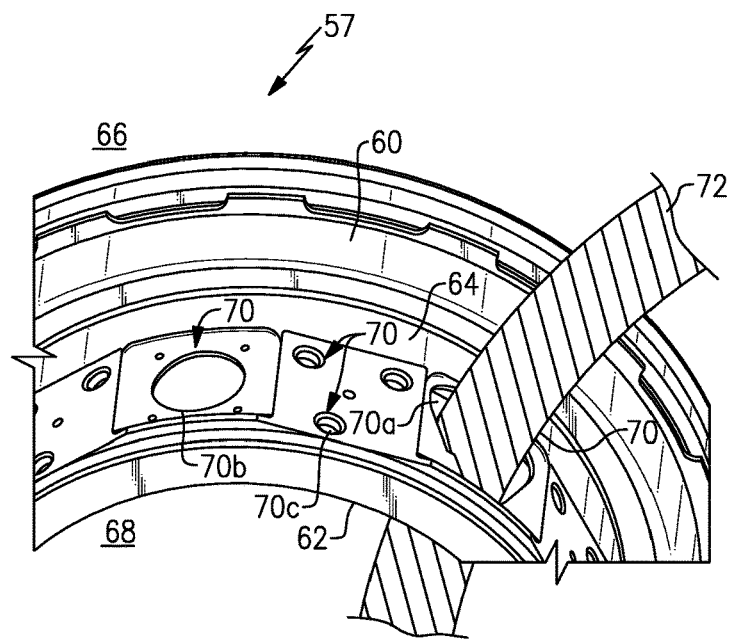
FIG. 2 is a partial perspective view of an inner turbine case of a mid turbine frame that includes an example of a service hole and a balance hole.
Figure 3:
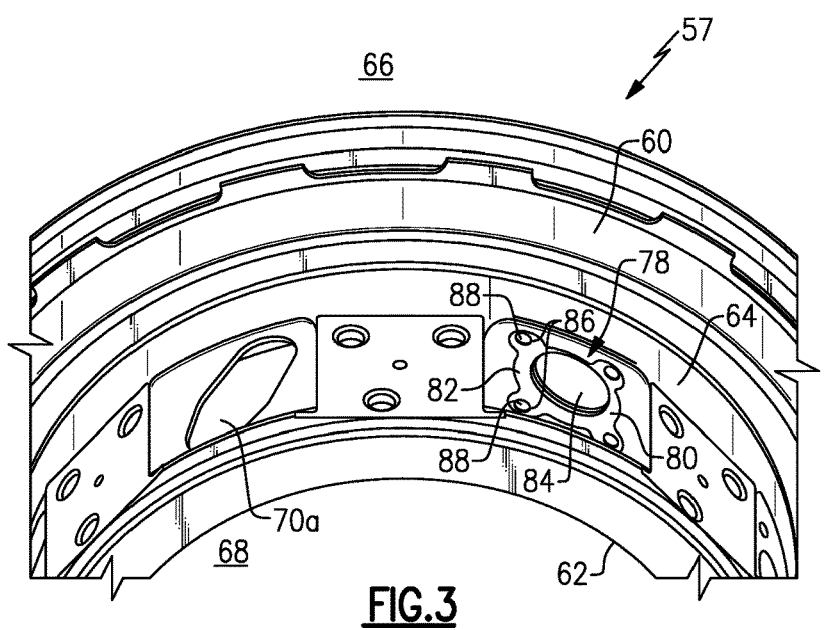
FIG. 3 is similar to FIG. 2 but shows the subject cover over the balance hole.

As discussed above, the mid-turbine frame 57 of the engine static structure 36 is arranged generally between the high pressure turbine 54 and the low pressure turbine 46. As shown in FIGS. 2-3, the mid turbine frame 57 includes an inner turbine case 60 surrounding the engine center axis A. The inner turbine case 60 is configured to allow other components, such as liquid or gas service lines for example, to pass through. The inner turbine case 60 also includes certain geometric features that balance stiffness in a circumferential direction. For example, at circumferential locations where there are no service lines, there are additional features formed on the inner turbine case 60 such that stiffness is balanced. These features will be discussed in greater detail below.

The inner turbine case 60 comprises a ring-shaped structure having an inner peripheral surface 62 radially spaced from an outer peripheral surface 64. An outer cavity 66 is positioned radially outward of the outer peripheral surface 64 and an inner cavity 68 is positioned radially inward of the inner peripheral surface 62. A plurality of holes 70 are formed to extend through the inner turbine case 60 for mounting purposes, to allow other structures to pass through, and/or to provide a balancing effect.

In one example, the plurality of holes 70 includes one or more service holes 70a that extend through a thickness of the inner turbine case 60 from the inner peripheral 62 surface to the outer peripheral surface 64. These service holes 70a are configured to allow another engine component 72, such as a liquid or gas service line for example, to pass through the hole 70a. In one example, the engine component 72 comprises an oil service line; however, other components could also be passed through the hole 70a. When the service line is passed through the hole 70a, there are still air gaps between the outer surface of the line and the hole perimeter such that cooling air can be forced through the hole 70a from the inner cavity 68 to the outer cavity 66.

In one example, the plurality of holes 70 includes one or more balance holes 70b that extend through a thickness of the inner turbine case 60 from the inner peripheral 62 surface to the outer peripheral surface 64. These balance holes 70b are needed for structural purposes; however, these holes 70b open up a flow area between the inner 68 and outer 66 cavities, which is not desirable from a secondary flow perspective.

The inner turbine case 60 may include additional mount holes 70c, which are used to attach other components to the case 60. For example, mount holes 70c are utilized to attach a tie rod structure (not shown) to the case 60. When the tie rod structure is attached, the mount holes 70c are covered; however, the balance holes 70b are still open allowing air to flow through these holes 70b from the inner cavity 68 to the outer cavity 66, which decreases cooling around the service lines.

To address this issue, as shown in FIG. 3, at least one cover 78 is configured to cover the one or more balance holes 70b such that air is prevented from passing through the hole 70b between the inner 68 and outer 66 cavities. The covers 78 are only placed over the balancing holes that do not provide structural support such that flow is blocked through these holes. This provides the benefit of forcing the cooling air to flow around and cool the service lines 72 that extend through the service holes 70a.

In one example, the cover 78 is made from a flexible material. One example material that can be used is a thin sheet metal; however, other flexible materials could also be used.

In one example, the cover 78 comprises a body 80 with an attachment portion 82 and an extension portion 84 extending away from (outwardly of or inwardly of) the attachment portion 82. The attachment portion 82 comprises a generally flat outer peripheral portion that is in direct contact with the inner turbine case 60. This flat outer peripheral portion, in one example, includes one or more openings 86 that are configured to receive a fastener 88. In one example, the fastener 88 comprises rivets that are used to fix the cover 78 to the outer peripheral surface 64 of the inner turbine case 60; however other attachment methods could also be used. The extension portion 84 is centrally located over each balancing hole 70b, for example. The extension portion is used such that case stiffness is not affected.

As shown in the Figures, the extension portion 84 comprises a protrusion on one side of the body 80, which correspondingly forms a cup-shaped recess on the opposite side of the body 80. In the example shown, the protrusion extends in a radially outward direction from the outer peripheral surface 64; however, the cover could also be positioned on a radially inward side of the case 60. Further, as shown, the protrusion can comprise a dome shape; however, other shapes such as a cone-shape, a triangular-shape, a flattened protrusion shape, etc. could also be used.

In the example shown, the covers 78 are utilized with a mid-turbine frame 57. It should be understood that the covers 78 could also be used with other engine structures. For example, the covers 78 could be used with an inner diffuser case 55 (FIG. 1) or other engine case structures.

The subject invention provides the benefit over existing configurations in that a cover structure is created that does not interact with the overall stiffness of the case. The soft, flexible cover blocks the flow but does not add any stiffness to the component. Further, by blocking the large open balance holes 70b with the cover 78, cooling of the service lines is significantly improved as cooling air from the inner cavity 68 is forced through the service holes 70a and around the service lines.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine component comprising:
an engine case structure surrounding an engine center axis;
a plurality of holes formed in the engine case structure, wherein the plurality of holes are circumferentially spaced apart from each other about the engine center axis, and wherein the plurality of holes includes at least one balance hole to balance stiffness of the engine case structure, at least one mount hole to attach a first engine component to the engine case structure, and at least one service hole that receives a second engine component that passes through the at least one service hole, and wherein the at least one balance hole, the at least one mount hole, and the at least one service hole are circumferentially spaced apart from each other; and
at least one cover that only covers the at least one balance hole such that air is prevented from passing through the at least one balance hole, and wherein the at least one cover is made from a flexible material and does not add any stiffness to the engine case structure.

2. The gas turbine engine component according to claim 1 wherein the at least one balance hole is at a circumferential location where there are no service lines.

3. The gas turbine engine component according to claim 2 wherein the second engine component comprises a liquid or gas service line that passes through the at least one service hole.

4. The gas turbine engine component according to claim 1 wherein the at least one cover comprises a body with an extension portion extending away from an attachment portion that is configured to fix the cover to the engine case structure.

5. The gas turbine engine component according to claim 4 wherein the attachment portion comprises a generally flat outer peripheral portion of the body that is in direct contact with the engine case structure, and wherein the extension portion is centrally located over the at least one balance hole.

6. The gas turbine engine component according to claim 5 wherein the flat outer peripheral portion includes at least one opening configured to receive a fastener.

7. The gas turbine engine component according to claim 1 wherein the engine case structure comprises an inner diffuser case or an inner turbine case of a mid turbine frame, and wherein the at least one balance hole comprises a set of balance holes, the at least one mount hole comprises a set of mount holes separate from the set of balance holes, and the at least one service hole comprises a set of services holes that is separate from the sets of balance and mount holes, and wherein the sets of balance, mount, and services holes are circumferentially spaced apart from each other.

8. The gas turbine engine component according to claim 7 wherein the inner turbine case comprises a ring-shaped structure having an inner peripheral surface radially spaced from an outer peripheral surface, and wherein the plurality of holes extend through a thickness of the inner turbine case from the inner peripheral surface to the outer peripheral surface.

9. The gas turbine engine component according to claim 1 wherein the at least one balance hole comprises a plurality of balance holes that balance stiffness of the engine case structure and wherein the at least one service hole comprises a plurality of component holes that receive one second engine component that passes through a respective component hole, and wherein the at least one mount hole comprises a plurality of mount holes, and wherein the plurality of component holes are circumferentially spaced from the plurality of balance holes and the plurality of mount holes are circumferentially spaced from the plurality of balance holes and the plurality of component holes.

10. The gas turbine engine component according to claim 9 wherein the at least one cover comprises a plurality of covers, and wherein the plurality of balance holes are at circumferential locations where there are no additional engine components to pass through the engine case structure such that each balance hole includes one cover to prevent flow through the plurality of balance holes.

11. The gas turbine engine component according to claim 1 wherein the second engine component comprises a service line that passes through the at least one service hole, and wherein the at least one cover blocks flow through the at least one balance hole to force flow to flow around the service line and through the at least one service hole.

12. A gas turbine engine comprising:
at least a first spool and a second spool;
a first turbine mounted to the first spool for rotation about an engine center axis;
a second turbine mounted to the second spool that rotates at a higher speed than the first spool;
a mid turbine frame arranged axially between the first turbine and the second turbine, wherein the mid turbine frame includes an inner turbine case surrounding the engine center axis;
a plurality of holes formed in the inner turbine case, and wherein at least one service hole of the plurality of holes receives at least one first engine component that passes through the at least one service hole, and wherein at least one balance hole of the plurality of holes is circumferentially spaced from the at least one service hole and is separate from the at least one service hole and is used to balance case stiffness of the inner turbine case, and wherein at least one mount hole of the plurality of holes attaches a second engine component to the inner turbine case and is separate from and circumferentially spaced from the at least one service hole and the at least one balance hole; and
at least one cover that only covers the at least one balance hole such that air is prevented from passing through the at least one balance hole, and wherein the at least one cover is made from a flexible material and does not add any stiffness to the inner turbine case.

13. The gas turbine engine according to claim 12 wherein the first turbine is a low pressure turbine and the second turbine is a high pressure turbine, and wherein the at least one balance hole comprises a set of balance holes, the at least one mount hole comprises a set of mount holes separate from the set of balance holes, and the at least one service hole comprises a set of services holes that is separate from the sets of balance and mount holes, and wherein the sets of balance, mount, and services holes are circumferentially spaced apart from each other.

14. The gas turbine engine according to claim 12 wherein the inner turbine case comprises a ring-shaped structure having an inner peripheral surface radially spaced from an outer peripheral surface, and wherein the plurality of holes extend through a thickness of the inner turbine case from the inner peripheral surface to the outer peripheral surface.

15. The gas turbine engine according to claim 14 wherein the at least one first engine component comprises a liquid or gas service line that passes through the at least one service hole.

16. The gas turbine engine according to claim 12 wherein the at least one cover comprises a body with an attachment portion and an extension portion extending away from the attachment portion, and wherein the attachment portion comprises a generally flat outer peripheral portion that is in direct contact with the inner turbine case and which includes at least one opening configured to receive a fastener, and wherein the extension portion is centrally located over the at least one balance hole.

17. The gas turbine engine according to claim 12 wherein the flexible material comprises sheet metal.

18. The gas turbine engine according to claim 12 wherein the at least one balance hole comprises a plurality of balance holes, and wherein the at least one cover comprises a plurality of covers with only the plurality of balance holes being covered by the plurality of covers.

19. The gas turbine engine according to claim 18 wherein the at least one service hole comprises a plurality of service holes that are circumferentially spaced from the plurality of balance holes, and wherein the at least one first engine component comprises a plurality of first engine components and wherein each service hole receives at least one of the first engine components that passes through the respective service hole.

20. The gas turbine engine according to claim 19 wherein the inner turbine case comprises a ring-shaped structure having an inner peripheral surface radially spaced from an outer peripheral surface, and wherein the pluralities of service and balance holes extend through a thickness of the inner turbine case from the inner peripheral surface to the outer peripheral surface.

21. The gas turbine engine according to claim 12 wherein the balance hole is at a circumferential location where there are no service lines.

22. The gas turbine engine according to claim 12 wherein the at least one balance hole comprises a plurality of balance holes that balance case stiffness and wherein the at least one first service comprises a plurality of service holes that each receive at least one first engine component that passes through a respective service hole, and wherein the at least one mount hole comprises a plurality of mount holes, and wherein the plurality of service holes are circumferentially spaced from the plurality of balance holes and the plurality of mount holes are circumferentially spaced from the plurality of balance holes and the plurality of service holes.

23. The gas turbine engine according to claim 22 wherein the at least one cover comprises a plurality of covers, and wherein the plurality of balance holes are at circumferential locations where there are no additional engine components to pass through the inner turbine case such that each balance hole includes one cover of the plurality of covers to prevent flow through the plurality of balance holes.

24. The gas turbine engine according to claim 12 wherein the at least one first component comprises a service line that passes through the at least one service hole, and wherein the at least one cover blocks flow through the at least one balance hole to force flow to flow around the service line and through the at least one service hole.

* * * * *